(No Model.) 2 Sheets—Sheet 1.
G. CRAIG.
APPARATUS FOR RECOVERING CYANIDS FROM FURNACE GASES.
No. 600,137. Patented Mar. 8, 1898.
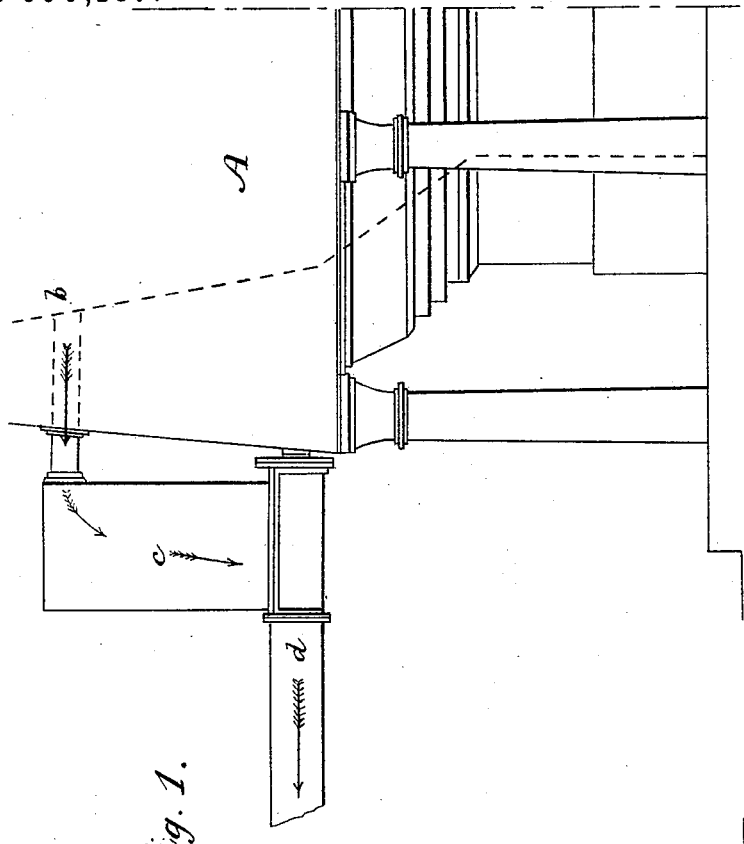
Fig. 1.
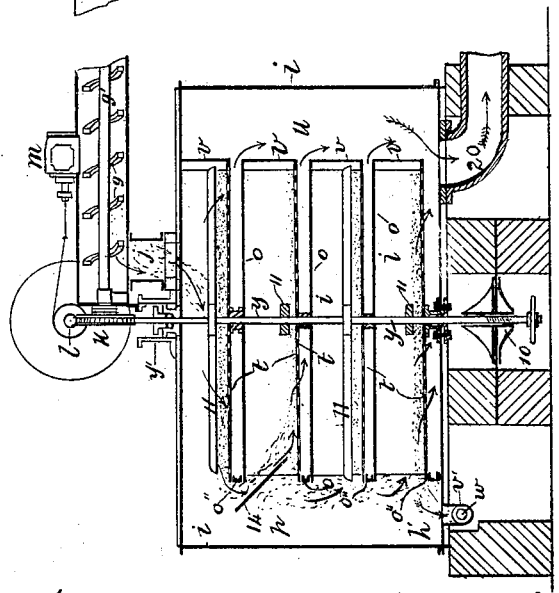
Witnesses Alexander Macalpine
Alex. Macalpine Jr.
Inventor George Craig
per David Ferguson Mason
Attorney.
THE NORRIS PETERS CO., PHOTO-LITHO., WASHINGTON, D. C.

(No Model.) 2 Sheets—Sheet 2.
G. CRAIG.
APPARATUS FOR RECOVERING CYANIDS FROM FURNACE GASES.
No. 600,137. Patented Mar. 8, 1898.
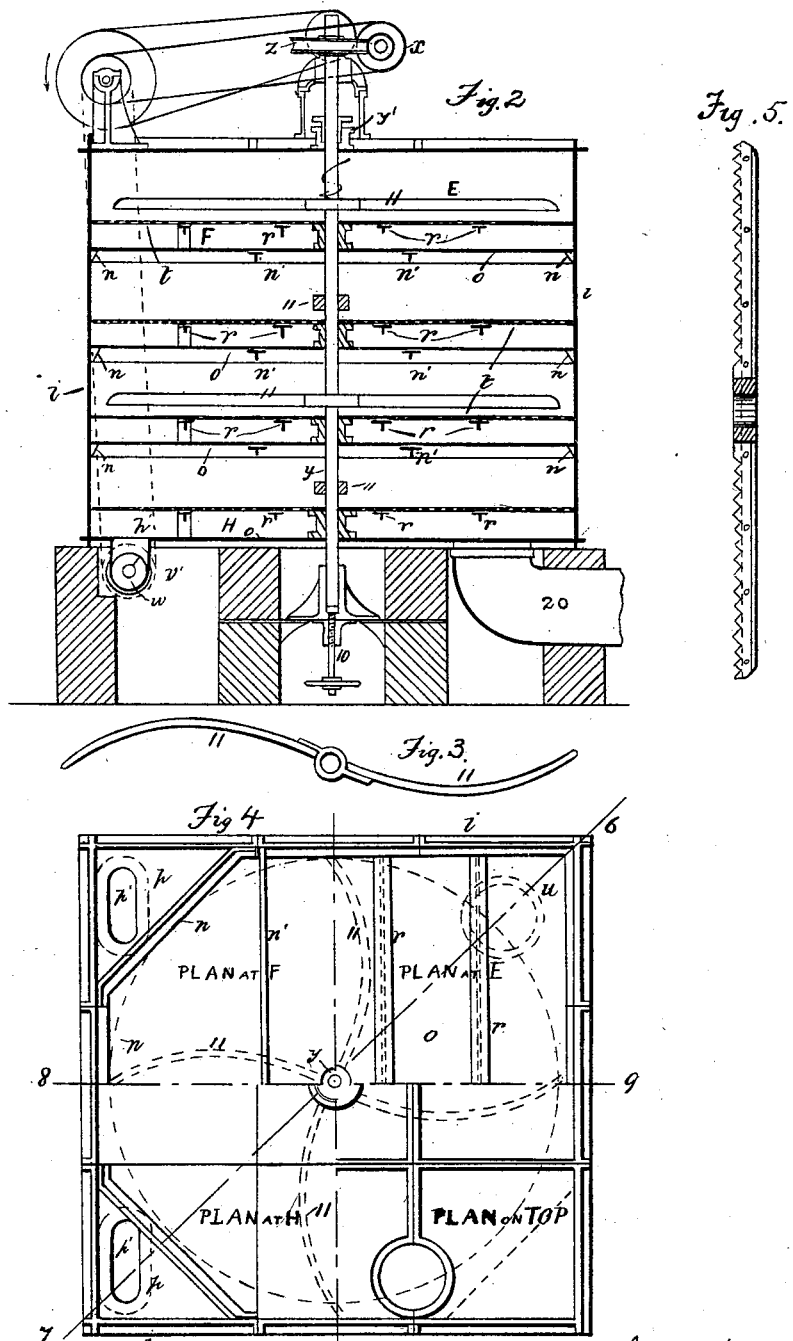

UNITED STATES PATENT OFFICE.

GEORGE CRAIG, OF GLASGOW, SCOTLAND.

APPARATUS FOR RECOVERING CYANIDS FROM FURNACE-GASES.

SPECIFICATION forming part of Letters Patent No. 600,137, dated March 8, 1898.

Application filed September 4, 1896. Serial No. 604,908. (No model.)

*To all whom it may concern:*

Be it known that I, GEORGE CRAIG, a subject of the Queen of Great Britain, residing at Glasgow, Lanarkshire, Scotland, have invented certain new or Improved Apparatus for Obtaining Alkaline Salts from Gases, of which the following is a specification.

Coal, coke, and certain other carbonaceous materials contain more or less alkalies—potash and soda. In blast-furnaces, where large quantities of the aforesaid materials are consumed, these alkalies accumulate in the lower regions of the furnace, and if gas is blown or drawn off thereat it will be found to be highly charged with vaporized alkaline salts, chiefly cyanids and carbonates. Similar results ensue in operations in which coal or coke is burned in an analogous way, with or without the addition of alkali, for the production of cyanids.

Figure 1 illustrates a portion of the lower part of a blast-furnace with the cooling-trap in elevation, the conveyer in longitudinal section, and the filtering apparatus in vertical section on a line 6 7 of Fig. 4. Fig. 2 is a vertical section of the filter alone, taken on the line 8 9 of Fig. 4. Fig. 3 is a horizontal section of a filter, and Figs. 4 and 5 are detail views of the scrapers.

As applied to a blast-furnace A, as shown at Fig. 1, I prefer to have an opening or openings located in the lower regions of the furnace at $b$, communicating directly with a metal cooling-trap $c$, which may be cooled by water or otherwise, if necessary, and in which any liquid or solid ejected matter from the furnace lodges and which may be cleaned out when required by doors. (Not shown.)

The trap $c$ has an opening at bottom into the pipe or case $d$, having a shaft $g'$, on which is a spiral conveyer $g$, which conveys the solid matters deposited thereabout to the opening $j$ into the filter-chamber $i$. The shaft $g'$ is revolved by worm-wheel $k$, wrought by a worm $l$, driven by any suitable motor-engine $m$.

The outer filter-chamber $i$ may conveniently be built up of iron plates into an outer square case, having flanges $n$ on its inner sides and cross T-iron beams $n'$ from side to side, which support bed-plates $o$, each constituting the bottom or longitudinal partition of the separate inner chambers or compartments into which the main chamber may be divided. On other cross T-iron beams $r$ from side to side and flanges $s$ a little above level of partition-plates $o$ is supported a sieve or salts-supporter $t$, forming, as it were, a false bottom in its chambers, preferably of wire-gauze, (but which may be of any other suitable material,) to support the layer of alkaline salts constituting the filtering medium. Both left-hand corners $p$ of outer case $i$ are open from top to bottom, not being separated by the bed-plates $o$; but the space between the sieve $t$ and bed-plates $o$ thereat is separated therefrom by corner double-angle-iron pieces $o''$, as shown in Fig. 1, which figure also shows how the upper right-hand corner $u$ on plan is separated off from between the top of each compartment and the perforated or woven sheet $t$ by the corner side plates $v$. The lower right-hand corner on plan, if not required to form any passage, may be separated off by a corner side plate continuous from top to bottom. The two left-hand corners $p$ of case $i$ have openings $p'$ at bottom into tube or case $v'$, having a spiral conveyer $w$ on a shaft revolved by a pulley and belt (indicated by dotted lines) and driven from a wheel $x$ on motor-engine shaft.

Vertically up through center of filter-case is a shaft $y$, revolved through a worm-wheel $z$ thereon from motor-engine. Said shaft is made capable of being adjusted vertically within given limits by an adjusting-screw 10, on which it is stepped at bottom. The shaft $y$ is fitted with scrapers 11, which revolve with shaft and which may be curved, as shown in plan, or other shape. The scrapers may be raised or lowered to vary the depth of the layer of salts forming the filtering medium supported on the sheets $t$. The shaft $y$ revolves at top in a stuffing-box $y'$, and provision is made by a feather and groove whereby the shaft may be raised and lowered without disturbing its worm-wheel.

The operation is as follows: The gases, loaded with alkaline salts from the furnace A, pass by pressure or suction, and, as indicated by the arrows, through the furnace-opening $b$ into the cooler-trap $c$ and thence along the conveyer-tube $d$, wherein the salts which partly deposit therein are conveyed to the opening $j$. The valve thereat being open the salts fall onto the top supporting-sheet $t$, upon which they are uniformly spread to any desired depth by the revolving scraper 11. The gases still containing some suspended alkaline salts escape through the supporting-sheets $t$ to the common vertical passage $u$, thence to the outlet-main 20, whence they may be utilized for heating or other purposes. In a new filter deflector-plates 14 may be employed to more expeditiously cover the sieves with the requisite layer of alkaline salts, after attaining which they may be put out of action. The filter-layer being now prepared of the desired depth, when gases loaded with alkaline salts are passed therethrough they are deprived of their alkaline salts, and the scraper removing the excess the operation becomes continuous. The excess salts are swept over by the scrapers and fall to the bottom of the corner-spaces $p$, thence through the openings $p'$ into the conveyer-tube, whereby they are conveyed to a receptacle (not shown) from which they may be collected.

What I claim, and desire to secure by Letters Patent, is—

1. A furnace, a cooling-chamber connected thereto, a pipe extending from the cooling-chamber, and a conveyer placed in the pipe, combined with a closed filter-chamber, horizontal perforated supports placed therein, a vertical shaft extending through the chamber, scrapers applied thereto, and a mechanism for driving the shaft, and causing the scrapers to sweep over the supports, substantially as shown.

2. A furnace, a cooling-chamber connected thereto, a pipe leading from the chamber, and a conveyer placed in the pipe, combined with a closed filtering-chamber, vertical and horizontal partitions placed in the chamber so as to direct the current of gases, perforated supports connected to the vertical partitions and placed above the horizontal ones, and scrapers for sweeping the deposits from the supports, substantially as described.

3. In an apparatus for obtaining alkaline salts from gases, a closed chamber, and means for conducting to it the products of combustion from the furnace, combined with the vertical partitions $v$, the horizontal perforated supports $t$, connected to their lower edges, the horizontal partitions connected to the upper edges of the vertical ones, a vertical shaft extending through the chamber, means for adjusting it, vertically, and means for driving it, scrapers secured to the shaft for sweeping the salt from the perforated supports, substantially as set forth.

GEORGE CRAIG.

Witnesses:
DAVID F. MASON,
WILLIAM DUNN.